United States Patent
Shimomura

(10) Patent No.: US 9,657,821 B2
(45) Date of Patent: May 23, 2017

(54) SINGLE-AXIS ACTUATOR

(71) Applicant: NSK LTD., Shinagawa-ku, Tokyo (JP)

(72) Inventor: Yuya Shimomura, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/996,992

(22) Filed: Jan. 15, 2016

(65) Prior Publication Data

US 2016/0131234 A1     May 12, 2016

Related U.S. Application Data

(62) Division of application No. 14/347,835, filed as application No. PCT/JP2013/001867 on Mar. 19, 2013.

(30) Foreign Application Priority Data

Mar. 22, 2012    (JP)  ................................. 2012-066339

(51) Int. Cl.
    *F16H 25/22*      (2006.01)
    *F16C 29/06*      (2006.01)
    *F16H 25/20*      (2006.01)

(52) U.S. Cl.
    CPC ....... *F16H 25/2219* (2013.01); *F16C 29/063* (2013.01); *F16C 29/0609* (2013.01);
(Continued)

(58) Field of Classification Search
    CPC ........................... F16C 29/063; F16C 29/0611
    See application file for complete search history.

(56) References Cited

U.S. PATENT DOCUMENTS 5,279,175 A      1/1994    Kasuga et al.

FOREIGN PATENT DOCUMENTS

JP      63-193637 U      12/1988
JP      5-3715 U      1/1993
(Continued)

OTHER PUBLICATIONS

International Search Report (PCT/ISA/210) with English translation dated May 28, 2013 (Five (5) pages).
(Continued)

*Primary Examiner* — Terence Boes
(74) *Attorney, Agent, or Firm* — Crowell & Moring LLP

(57) ABSTRACT

As compared to a single-axis actuator in which a ball returning passage of a ball screw mechanism is made of a circulating tube, the cross-sectional shape perpendicular to the longitudinal direction of a threaded shaft of a slider can be made small, when the diameter of the outer circumferential circle of the threaded shaft of the present invention is same as that of the circulating tube type, and the load capacity can be made large, when the size in the longitudinal direction of the threaded shaft of the slider of the present invention is same as that of the circulating tube type. The ball returning passage for returning the balls (4) of a ball screw mechanism from an end point to a start point of a raceway encompasses: a through hole (24) penetrating through a slider (2) in a longitudinal direction of a threaded shaft (3); and end deflectors (6). Each of the end deflector (6) has a direction changing passage to be connected with the through hole (24). A main body (61) of the end deflector (6) is fit into a notch part (26) arranged on each of both ends in the longitudinal direction of the threaded shaft (3) of a slider body (2A).

2 Claims, 9 Drawing Sheets

(52) U.S. Cl.
CPC ...... *F16C 29/0611* (2013.01); *F16H 25/2214* (2013.01); *F16H 2025/204* (2013.01); *F16H 2025/2034* (2013.01); *Y10T 74/18576* (2015.01)

(56) References Cited

FOREIGN PATENT DOCUMENTS

| JP | 3431354 B2 | 5/2003 |
|---|---|---|
| JP | 2003-269565 A | 9/2003 |
| JP | 2006-342905 A | 12/2006 |
| JP | 2010-106934 A | 5/2010 |
| JP | 2010-196761 A | 9/2010 |

OTHER PUBLICATIONS

Japanese language International Written Opinion (PCT/ISA/237) dated May 28, 2013 (Five (5) pages).
Japanese Office Action dated Aug. 26, 2014, with English translation (Eight (8) pages).
International Preliminary Report on Patentability (PCT/IB/338 & PCT/IB/373) dated Oct. 2, 2014, including English translation of Written Opinion (PCT/ISA/237) (Nine (9) pages).
Korean Office Action dated Jan. 29, 2015, with partial English translation (Four (4) pages).
Taiwanese Office Action dated Apr. 30, 2015, with English translation (Twelve (12) pages).
Chinese Office Action issued in counterpart Chinese Application No. 201380002894.1 dated Sep. 6, 2015, with English translation (Seven (7) pages).
European Search Report issued in counterpart European Application No. 13764143.7 dated Sep. 6, 2016 (seven pages).

SINGLE-AXIS ACTUATOR

CROSS REFERENCE TO RELATED APPLICATIONS

This application is a divisional of U.S. application Ser. No. 14/347,835, filed Mar. 27, 2014, which is a National Stage of International Application No. PCT/JP2013/001867, filed Mar. 19, 2013, which claims priority from Japanese Application No. 2012-66339, filed Mar. 22, 2012, the disclosures of which are expressly incorporated by reference herein.

TECHNICAL FIELD

This invention relates to single-axis actuators.

BACKGROUND ART

A single-axis actuator, in which a ball screw mechanism and a linear guide mechanism are combined together, has a guide rail having a letter U shaped cross section perpendicular to a longitudinal direction of the actuator, a slider arranged in a letter U shaped depression of the guide rail, and plural rolling elements allocated between the guide rail and the slider. In the slider, a nut is formed in parallel to the guide rail, so that the plural balls are allocated in a raceway formed by a spiral groove of the nut and a spiral groove of a threaded shaft penetrating through the nut.

The guide rail has a rolling face implementing a rolling passage for the rolling elements on each of the inner faces opposing each side faces of the slider. The slider has a rolling face opposing the rolling face of the guide rail so as to implement a rolling passage, a returning passage for the rolling elements, and a direction changing passage for communicating the returning passage and the rolling passage. The rolling elements are allocated in a circulating passage implemented by the rolling passage, the returning passage, and the direction changing passage. The single-axis actuator further includes a circulating part for returning the balls from the endpoint to the start point of the raceway.

Then, the single-axis actuator is configured so that the rotational force of the threaded shaft is transmitted through the balls to the nut by rotation of the threaded shaft, the rolling elements circulate in the circulating passage while rolling in the rolling passage in a loaded state, and the slider moves along the guide rail.

As a conventional example of the above single-axis actuator, PTL 1 and PTL 2 disclose the single-axis actuators into which rollers are incorporated as the rolling elements, respectively. By using the rollers as the rolling elements, it is possible to increase the load capacity and rigidity while ensuring the lightweight and compact size, as compared to the case of using the balls.

In the single-axis actuator disclosed in PTL 1, a female screw part of the bearing block (i.e., the nut of the slider) is formed by insert molding.

In the single-axis actuator disclosed in PTL 2, in order to ensure the light weight and compact size at a low cost, the DF contact structure (i.e., the structure in which the virtual intersection point of the load-effecting lines of rows of rollers rolling in a double-row rolling passage formed on each of inner faces is arranged on the inner side of the rolling passage in the width direction of the actuator) is employed and the nut is directly formed in the slider.

In a conventional single-axis actuator, a circulating tube is used for implementing the ball returning passage for returning the balls from the end point to the start point of the raceway. That is, the slider is configured to have through holes penetrating perpendicularly to a longitudinal direction of the threaded shaft. Leg parts of the circulating tube are inserted into the through holes, respectively, so as to secure the circulating tube onto either the top face or the bottom face of the slider by an attachment bracket. Besides, in the conventional single-axis actuator, the area of the outer circumferential circle of the threaded shaft is less than 20% of the area of the cross section perpendicular to the longitudinal direction of the threaded shaft of the slider.

PTL 3 discloses that the ball returning passage of the ball screw apparatus is configured to encompass the through hole penetrating through the nut in the longitudinal direction of the threaded shaft, and circulating parts (i.e., circulating pieces) having the direction changing passage connected to the through hole and disposed at both ends in the longitudinal direction of the threaded shaft of the nut. In addition, PTL 3 also discloses that the circulating part has a retaining projection for preventing from being dropped out in the longitudinal direction of the threaded shaft (i.e., a projection at a part to be contact with the radial inner face of the nut), and a depression into which the retaining projection is fit is provided on the radial inner face of the nut.

Further, in the case of the ball screw apparatus, the structure with the use of a letter C shaped retaining ring can be considered to be a retaining structure for preventing the circulating parts disposed at both ends in the longitudinal direction of the threaded shaft of the nut from dropping out in the longitudinal direction of the threaded shaft.

CITATION LIST

Patent Literature

PTL 1: JP Patent Number 3,431,354
PTL 2: JP 2010-106934 A
PTL 3: JP 2003-269565 A

SUMMARY OF INVENTION

Technical Problem

When the circulating tube is secured onto the bottom face of the slider in the single-axis actuator and the circulating tube protrudes from the bottom face of the slider, the circulating tube may be contacted with the guide rail, unless there is a sufficient space between the bottom face of the slider and the bottom face of the letter U shaped guide rail.

When the circulating tube is arranged on the top face of the slider, the depression into which the circulating tube is disposed needs to be provided, or an escape part of the circulating tube needs to be provided on a work piece (i.e., a member secured onto the slider) side for protruding the circulating tube from the top face of the slider. In the method of providing the depression on the top face of the slider, the cross-sectional shape perpendicular to the longitudinal direction of the threaded shaft of the slider will be large. In the method of providing the escape part on the work piece side, the production cost will be increased.

Further, the slider of the single-axis actuator has, in general, a slider body in which the spiral groove of the nut is formed, and an end cap secured on the outer side in the longitudinal direction of the threaded shaft of the slider body. Accordingly, in the method of providing the circulating tube in the depressed part on the top face of the slider, since an end face in the longitudinal direction of the threaded shaft needs to be contact with the end cap, one end part in the longitudinal direction of the threaded shaft of the spiral groove of the nut is not used as the raceway of the balls of the ball screw mechanism.

According to an object of the present invention, as compared to the single-axis actuator in which the ball returning passage of the single-axis actuator is made of a circulating tube, the cross-sectional shape perpendicular to the longitudinal direction of the threaded shaft of the slider is made small, when the diameter of the outer circumferential circle of the threaded shaft of the present invention is same as that of the circulating tube type, and the load capacity is made large, when the size in the longitudinal direction of the threaded shaft of the slider of the present invention is same as that of the circulating tube type.

Solution to Problem

In order to address the above object, in a single-axis actuator according to one aspect of the present invention, a ball returning passage for returning balls from an endpoint to a start point of a raceway is implemented by: a through hole penetrating through the slider in the longitudinal direction of the threaded shaft; and circulating parts having direction changing passages connected with the through hole and arranged both ends of the slider in the longitudinal direction of the threaded shaft.

That is, the single-axis actuator according to one aspect of the present invention has the following configurations.

(1) A guide rail having a letter U shaped cross section perpendicular to a longitudinal direction of the single-axis actuator; a slider arranged in a depression of the guide rail having the letter U shaped cross section; a plurality of rolling elements allocated between the guide rail and the slider; a nut formed in the slider to be parallel to the guide rail; a threaded shaft penetrating through the nut; and a plurality of balls allocated in a raceway between a spiral groove of the nut and a spiral groove of the threaded shaft.

(2) the guide rail has a rolling face implementing a rolling passage for the plurality of rolling elements, on each of inner side faces opposing each of side faces of the slider, the slider includes a rolling face for opposing the rolling face of the guide rail and implementing the rolling passage, a returning passage for the plurality of rolling elements, and a direction changing passage for communicating the returning passage and the rolling passage, wherein the plurality of rolling elements are allocated in a circulating passage implemented by the rolling passage, the returning passage, and the direction changing passage.

(3) a ball returning passage for returning the plurality of balls from an end point of the raceway to a start point of the raceway is implemented by a through hole penetrating through the slider in a longitudinal direction of the threaded shaft, and circulating parts having direction changing passages connected with the through hole and allocated at both ends in the longitudinal direction of the threaded shaft of the slider.

(4) a rotational force of the threaded shaft is transmitted via the plurality of balls to the nut by rotation of the threaded shaft, the rolling elements circulate in the circulating passage while rolling in a loaded state, and the slider is movable along the guide rail.

According to the single-axis actuator of one aspect of the present invention, the circulating parts for returning the balls from the end points to the start points the raceway are arranged at both ends in the longitudinal direction of the threaded shaft of the slider, respectively. Thus, the whole length of the spiral groove of the nut in the longitudinal direction of the threaded shaft is used as a raceway of the balls in the ball screw mechanism. Therefore, as compared to the case where the circulating tube is used as the circulating part, when the size in the longitudinal direction of the threaded shaft of the slider according to the one aspect of the present invention is same as that of the circulating tube type, the load capacity can be made larger. When the circulating tube is used as the circulating part, both ends in the longitudinal direction of the threaded shaft of the spiral groove of the nut is not used as the raceway of the balls in the ball screw mechanism, in some cases.

In addition, according to the single-axis actuator of one aspect of the present invention, the circulating part is not provided on either the top face or the bottom face. Hence, the cross-sectional shape perpendicular to the longitudinal direction of the threaded shaft of the slider will not become larger by the circulating part. Accordingly, the area of the outer circumferential circle of the threaded shaft can be made 20% or more of the area of the cross section perpendicular to the longitudinal direction of the threaded shaft of the slider.

That is, in the single-axis actuator according to one aspect of the present invention, an area S1 of an outer circumferential circle of the threaded shaft and an area S2 of a cross section of the slider cut along a plane perpendicular to the longitudinal direction of the threaded shaft can satisfy $S_1 >= 0.2 S_2$.

According to the single-axis actuator of one aspect of the present invention, the plurality of the rolling elements may be rollers, and a virtual intersection point of load effecting lines of rows of the rollers rolling in a double-row rolling passage formed in the each of inner faces of the guide rail may exist on an inner side of the rolling passage in a width direction of the guide rail.

When the single-axis actuator according to one aspect of the present invention has the following configurations (5) to (7), it is preferable to include the following configuration (8) and it is more preferable to include the following configuration (9). In addition, it is preferable to further include the following configuration (10).

(5) the slider includes a slider body and an end cap secured on an outer side of the slider body in the longitudinal direction of the threaded shaft, the spiral groove of the nut is formed in the slider body.

(6) an end of the slider body in the longitudinal direction of the threaded shaft has a non-nut part in which the spiral groove is not formed.

(7) a circulating part depression is formed for fitting the circulating part at a boundary with the non-nut part on an inner circumferential face of a nut part in which the spiral groove is formed, the circulating part is fit in the circulating part depression.

(8) a spacer is arranged in the non-nut part, and the spacer is arranged between the circulating part and the end cap in a contact state.

(9) a spacer is arranged in the non-nut part, and the spacer is arranged in a shrinking state by elastic deformation between the circulating part and the end cap.

(10) a spacer depression into which the spacer is fit is formed to be continuous with the circulating part depression in the longitudinal direction of the threaded shaft, and the spacer is fit in the spacer depression.

As a material of the spacer, aluminum alloy, synthetic resin such as polyacetal resin, thermoplastic elastomer, rubber, or the like can be used.

When the single-axis actuator according to one aspect of the present invention has the non-nut part in the slider body, the circulating part is arranged at the depression at the boundary with the non-nut part on the nut part. That is, in the single-axis actuator with the above configurations (5) to (7), since the circulating part depression is arranged at a position apart from the end in the longitudinal direction of the threaded shaft of the slider body, the circulating part needs to prevent from being dropped out to the non-nut part in the longitudinal direction of the threaded shaft.

As a countermeasure, as disclosed in PTL 3, if the method of providing on the circulating part the retaining projection for preventing the circulating part from being dropped out in the longitudinal direction of the threaded shaft and providing a retaining depression into which the retaining projection is fit on the nut part is employed, as the depression into which the circulating part is attached is apart from the end in the longitudinal direction of the threaded shaft, the work of attaching the circulating part is difficult and the work of confirming whether or not the circulating part is attached properly is also difficult.

Besides, if the method of using the letter C shaped retaining ring is employed, the whole size in the longitudinal direction of the threaded shaft of the non-nut part needs to be enlarged than a usual case, so as to form a locking part of the letter C shaped retaining ring. In the above method, the non-nut part becomes thin, and it is not preferable in ensuring the mechanical strength of the slider body. Moreover, if the size of the non-nut part in the longitudinal direction of the threaded shaft is long, the work of attaching the letter C shaped retaining ring is difficult.

In contrast, when the above configuration (8) is included, the spacer is inserted toward the circulating part fit into the circulating part depression from the non-nut part side of the slider body, and the end cap is secured onto the slider body, so that the circulating part is prevented from being dropped out to the non-nut part in the longitudinal direction of the threaded shaft.

Accordingly, the work of attaching the circulating part is facilitated and the work of confirming the attached state is facilitated or eliminated. Furthermore, the non-nut part in the whole size in the longitudinal direction of the threaded shaft need not be enlarged as compared to a usual case, so that the mechanical strength of the slider body is ensured. Moreover, by further including the above configuration (10), the work of attaching the circulating part is facilitated and the work of attaching the spacer is also facilitated, as compared to the case where the above configuration (10) is not included.

In addition, by including the above configuration (9), the circulating part can be secured with certainty by use of the elastic deformation of the spacer.

According to the single-axis actuator of one aspect of the present invention, it is preferable to include at least any one of the following configurations (11) and (12).

(11) the through hole implementing the ball returning passage is allocated within a range of a circle indicating a groove bottom of the spiral groove of the nut in a vertical direction of the slider body.

(12) the slider includes a slider body and an end cap secured on an outer side of the slider body in the longitudinal direction of the threaded shaft, the spiral groove of the nut is formed in the slider body, the slider body has a depression into which the circulating part is fit, and a direction of the circulating part scooping the plurality of balls is parallel or perpendicular to a top face of the slider body.

As described above, according to the single-axis actuator of one aspect of the present invention, since the whole length of the spiral groove of the nut in the longitudinal direction of the threaded shaft is used as the raceway of the balls in the ball screw mechanism, the size of the nut in the longitudinal direction of the threaded shaft can be shortened, as compared to the conventional single-axis actuator in which the ball returning passage of the ball screw mechanism is implemented by the circulating tube. According to the single-axis actuator of one aspect of the present invention, when plural sliders are included, the stroke can be made longer than the conventional single-axis actuator.

Advantageous Effects of Invention

According to the present invention, as compared to the single-axis actuator in which the ball returning passage of the ball screw mechanism is made of a circulating tube, the cross-sectional shape perpendicular to the longitudinal direction of the threaded shaft of the slider can be made small, when the diameter of the outer circumferential circle of the threaded shaft of the present invention is same as that of the circulating tube type, and the load capacity can be made large, when the size in the longitudinal direction of the threaded shaft of the slider of the present invention is same as that of the circulating tube type.

DESCRIPTION OF EMBODIMENTS

Hereinafter, embodiments of the present invention will be described.

First Embodiment

Figure 1:
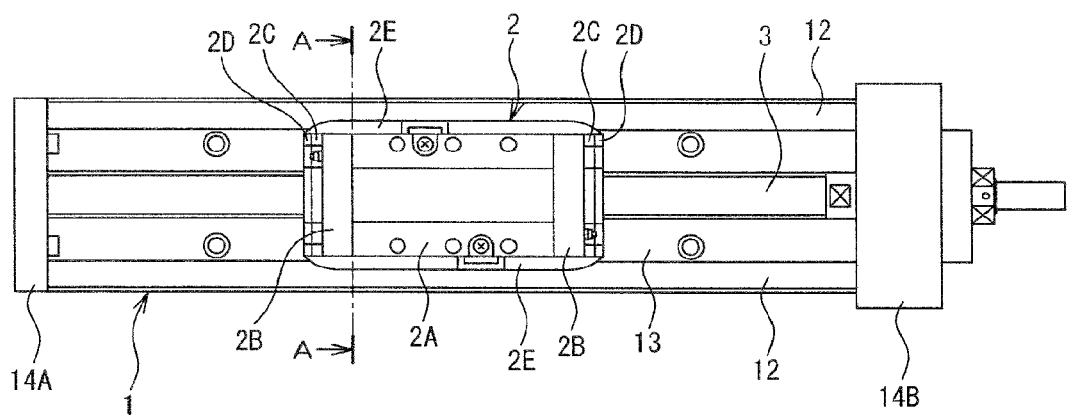
FIG. 1 is a plan view illustrative of a single-axis actuator according to a first embodiment of the present invention.
Figure 2:
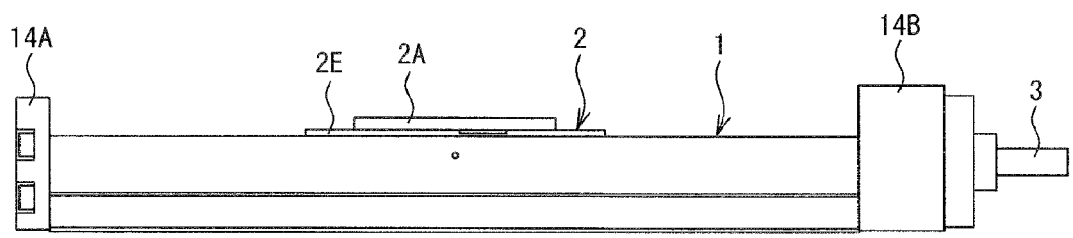
FIG. 2 is a side view of FIG. 1.
Figure 3:
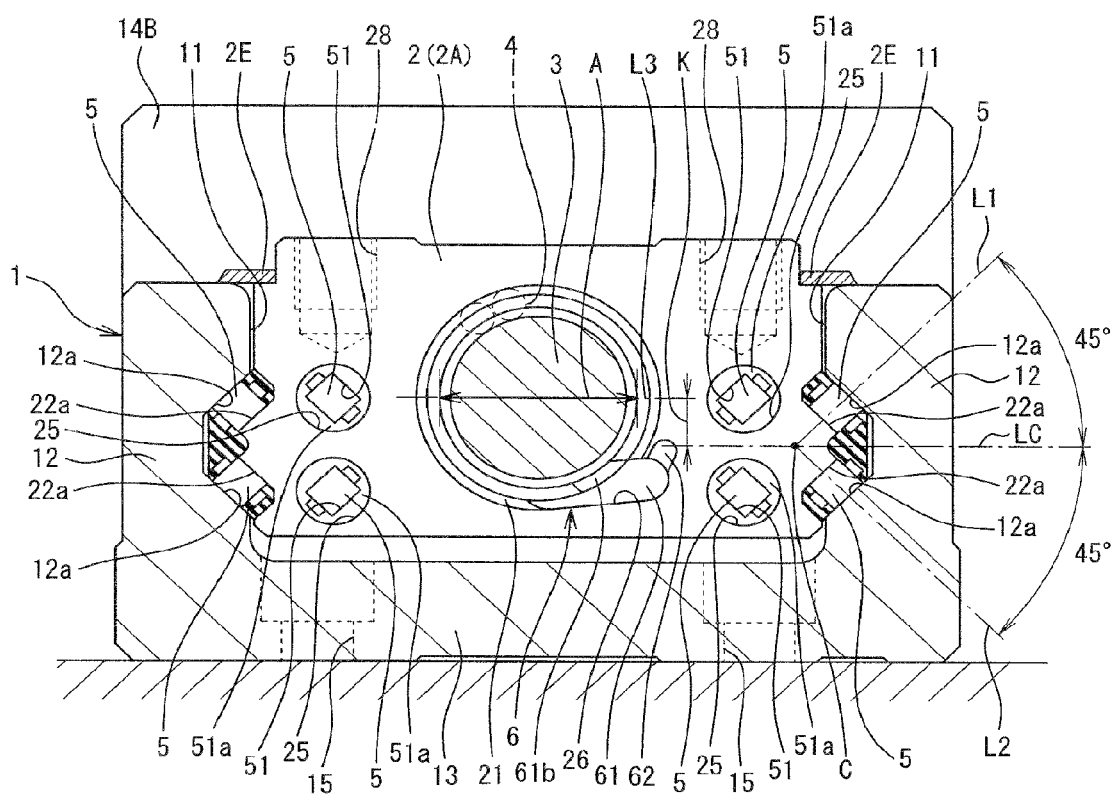
FIG. 3 is a cross-sectional view take along line A-A of FIG. 1.

FIG. 1 is a plan view illustrative of a single-axis actuator according to a first embodiment of the present invention. FIG. 2 is a side view of the single-axis actuator. FIG. 3 is a cross-sectional view (i.e., cross-sectional view taken along line A-A of FIG. 1) perpendicular to a linear movement direction (i.e., the longitudinal direction of a threaded shaft).

Referring to FIG. 1 to FIG. 3, the single-axis actuator encompasses a guide rail 1, a slider 2, a threaded shaft 3, balls 4, rollers 5, and end deflectors 6.

The guide rail 1 has a letter U shaped cross section perpendicular to the longitudinal direction, and the slider 2 is accommodated in a letter U shaped depression 11. The guide rail 1 is made of a pair of side parts 12, a bottom part 13, and end members 14A and 14B, and an inner face of each of the side parts 12 opposes each of side faces of the slider 2. A rolling face 12a implementing the rolling passage for the rollers 5 is formed on an inner face of each of the side parts 12. Through holes 15 are formed at the bottom part 13 of the guide rail 1 to let attachment bolts penetrate through the through holes 15, respectively. The through holes 15 are arranged on the bottom part 13 at boundary positions in the width direction with the side parts 12, respectively.

The slider 2 is divided into a slider body 2A, an end cap 2B, a lubricant supplying member 2C, and a side seal 2D, in the linear movement direction. A direction changing passage for the rollers 5 is formed in the end cap 2B. In addition, slide plates 2E to be arranged on the top face of the side part 12 of the guide rail 1 are provided on both sides in the width direction on the top of the slider 2, over the whole length in the linear movement direction.

A female screw (i.e., nut) 21 penetrating, in parallel to the guide rail 1, through the center of the cross section perpendicular to the longitudinal direction of the threaded shaft of the slider body 2A is provided at the slider body 2A. The nut 21 is formed by directly processing the spiral groove on the slider body 2A.

The threaded shaft 3 penetrates through the nut 21, and the balls 4 are allocated between the nut 21 and the threaded shaft 3 in the nut 21. The both ends in the longitudinal direction of the threaded shaft 3 are rollably supported by end members 14A and 14B at both ends in the longitudinal direction of the guide rail 1, respectively. One end in the longitudinal direction of the threaded shaft 3 (i.e., a part protruding on the right end in FIG. 1 and FIG. 2) is attached to a motor, when in use.

A rolling face 22a is formed on each of the side faces of the slider body 2A at a position opposing the rolling face 12a of the guide rail 1. The above-described opposing rolling faces 12a and 22a implement the rolling passage for the rollers 5. Two pairs of the above-described rolling passages, i.e., four rows in total are provided in such a manner that a virtual intersection point C of load-effecting lines L1 and L2 of rows of rollers rolling along the double-row rolling passage on each of the side parts 12 exists on the inner side of the rolling passage in the width direction of the guide rail 1. A virtual horizontal line LC passing through the virtual intersection point C is arranged on the lower side from the height of the center of the threaded shaft 3 (i.e., a line L3) by a dimension K. An angle (contact angle) made by the virtual horizontal line LC and the load-effecting lines L1 and L2 is respectively 45 degrees.

Figure 4A:
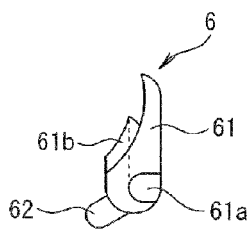
FIG. 4A is a rear view illustrative of an end deflector included in the single-axis actuator of FIG. 1 viewed from the left side in FIG. 4B.
Figure 4B:
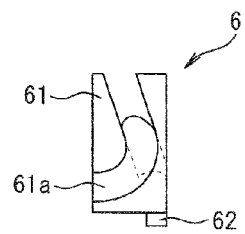
FIG. 4B is a view illustrative of the end deflector included in the single-axis actuator of FIG. 1 and a direction changing passage can be shown.
Figure 4C:
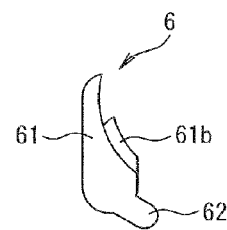
FIG. 4C is a front view illustrative of the end deflector included in the single-axis actuator of FIG. 1 viewed from the right side in FIG. 4B.

Each of the end deflectors 6 is made of a body 61 and a fixed piece 62, as illustrated in FIG. 4A to FIG. 4C, and a direction changing passage 61a and a tongue 61b are formed in the body 61.

Figure 5:
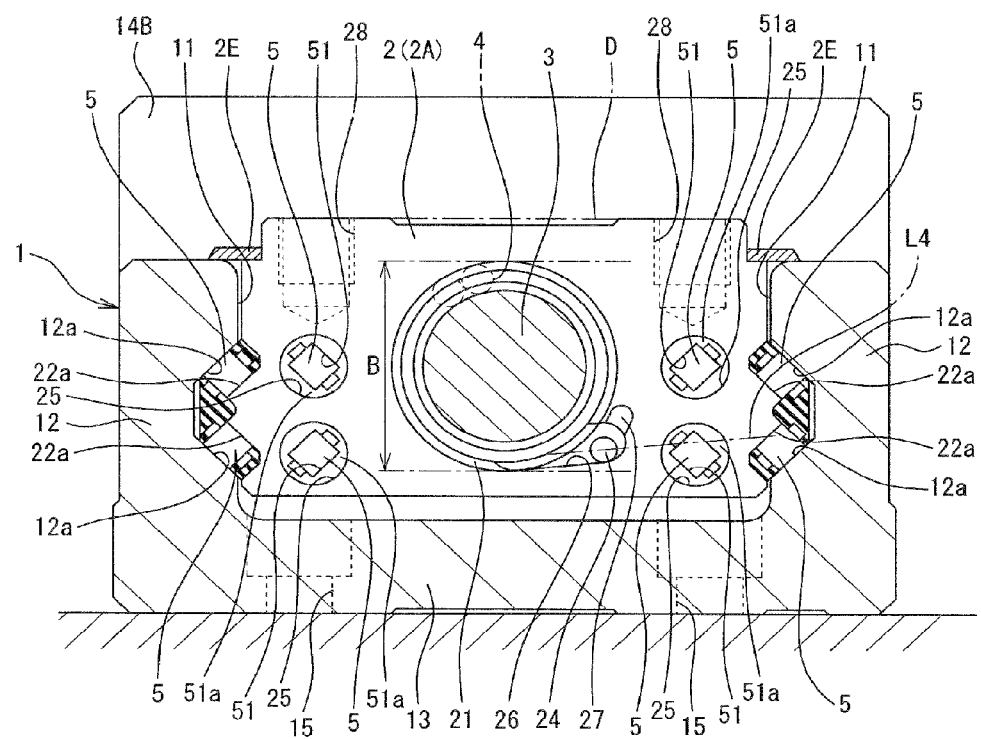
FIG. 5 is a cross-sectional view illustrative of the single-axis actuator in which the end deflector is removed from the slider body of FIG. 3.

Referring to FIG. 5, the slider body 2A is formed with through holes 24 and 25 penetrating through the slider body 2A in the longitudinal direction of the threaded shaft. The through hole 25 is a hole into which a sleeve 51a for implementing a returning passage 51 for the rollers 5 is inserted. The through hole 24 is a hole for implementing the returning passage for the balls 4, and is arranged on the right lower part of the nut 21.

Then, notch parts (i.e., circulating part depressions) 26, into which the bodies 61 of the end deflectors 6 are fit, are provided at both end faces in the longitudinal direction of the threaded shaft of the slider body 2A, in a range continuous with the spiral groove of the nut 21 and including the through hole 24. Depressions (i.e., circulating part depressions) 27, into which the fixed pieces 62 of the end deflectors 6 are respectively fit, are provided adjacent to the notch parts 26.

By fitting the body 61 of the end deflector 6 into the notch part 26, and in addition, by fitting the fixed piece 62 into the depression 27, the end deflector 6 is secured onto the end in the linear movement direction of the nut 21 of the slider body 2A. FIG. 3 illustrates the secured state. By the secured state, the direction changing passage 61a of the body 61 of the end deflector 6 is connected to the through hole 24 of the slider body 2A. In addition, the fixed piece 62 fit into the depression 27 restricts the movement of the end deflector 6 to the linear movement direction of the slider body 2A and to the radial and circumferential directions of the nut 21, so that the rotation of the body 61 in the above directions is stopped.

An area $S_1$ in the outer circumferential circle of the threaded shaft 3 (i.e., a circle having the diameter indicated by A in FIG. 3) is 24% of an area $S_2$ of the cross section perpendicular to the longitudinal direction of the threaded shaft of the slider body 2A (where $S_1 >= 0.2 S_2$). Specifically, the diameter A is 25 mm, the area $S_1$ is 490.6 mm², and the area $S_2$ is 2075 mm². The area $S_2$ conforms to the area of the range surrounded by the circle forming the inner circumferential face of the nut 21 and the external line of the slider body 2A in the cross section perpendicular to the linear movement direction of the slider body 2A, and does not include the cross-sectional area of the slide plate 2E.

When the linear movement apparatus is used, the guide rail 1 is secured onto a support by bolts with the use of the attachment holes 15. In the slider 2, spacers are secured onto female screw holes 28 formed on the top face of the slider body 2A, respectively, and then a movement member is secured on the top of both ends in the width direction of the spacers.

Then, by activating the motor to rotate the threaded shaft 3, the slider 2 moves along the guide rail 1, via the ball screw mechanism (including the nut 21, the threaded shaft 3, the balls 4, the direction changing passage 61a of the end deflector 6, and the through hole 24 of the slider body 2A) and the linear guide mechanism (including the rolling face 12a of the guide rail 1, the rolling face 22a of the slider body 2A, the rollers 5, the returning passage 51 of the slider body 2A, and the direction changing passage of the end cap 2B). In accordance with the above movement, the movement member linearly moves.

According to the single-axis actuator of the present embodiment, unlike the case where the ball returning passage is formed with the use of a circulating tube, since the end deflectors 6 are not provided on the top face or the bottom face of the slider 2, the cross-sectional shape perpendicular to the longitudinal direction of the threaded shaft of the slider 2 can be made smaller. In addition, the whole length in the longitudinal direction of the threaded shaft of the spiral groove of the nut 21 is used for the raceway of the balls 4 of the ball screw mechanism. Therefore, the single-axis actuator according to the present embodiment has a smaller cross-sectional shape perpendicular to the longitudinal direction of the threaded shaft of the slider 2 than that of a conventional single-axis actuator, when the diameter of the outer circumferential face of the threaded shaft 3 of the single-axis actuator according to the present embodiment is same as that of the conventional single-axis actuator, and the single-axis actuator according to the present embodiment has a larger load capacity than that of the conventional single-axis actuator, when the size in the longitudinal direction of the threaded shaft of the slider 2 according to the present embodiment is same as that of the conventional single-axis actuator.

Further, since the virtual intersection point C of the load-effecting lines of the rows of rollers rolling along the double-row rolling passage on each of the side parts 12 exists on the inner side of the rolling passage in the width direction (i.e., DF contact structure), the alignment performance is superior and the force generated by applying the prying force is also small. For this reason, in accordance with forming of the rolling face 22a of the rollers 5 and the spiral groove of the nut 21 (i.e., the ball rolling groove of the ball screw) in separate processes with respect to the slider 2, even if the misalignment occurs in the relative oppositions of the rolling surface 22a and the spiral groove, it is possible to suppress the reduced life accompanied by applying the prying force. Accordingly, as the accuracy of the relative positions of the rolling face 22a of the rollers 5 and the spiral groove of the nut 21 with respect to the slider 2 need not be high, the problem of increased cost or degraded productivity will not be produced. Furthermore, the contact angle is set to 45 degrees, so that the vertical and horizontal loads can be received in a balanced manner.

Moreover, according to the single-axis actuator of the present embodiment, the height of the center of the double-row rolling passage (i.e., the line LC) is arranged lower than the height of the center of the threaded shaft 3 (i.e., the line L). That is to say, the positions of the rolling faces 12a and 22a are arranged in the vicinity of the boundary with the bottom part 13 of the side part 12. Therefore, even if the slider 2 receives the load and the opening deformation is generated at the side part 12 of the guide rail 1, it is possible to reduce the unbalanced contact pressure distribution at the contact part between the rolling faces 12a and 22a and the rollers 5 generated by the tilts of the rolling faces 12a and 22a and to minimize the reduced life caused by the edge load, as much as possible.

Additionally, as illustrated in FIG. 5, since the through hole 24 implementing the ball returning passage is arranged within the range B of the circle indicating the groove bottom of the spiral groove of the nut 21 in a vertical direction of the slider body 2A, the vertical size of the slider body 2A can be made smaller than the case where the through hole 24 is arranged out of the range B. With the above configuration, the distance between the top face of the slider body 2A and the rolling face 22a of the linear guide mechanism can be made shorter. Further, it is possible to configure the cross-sectional shape perpendicular to the longitudinal direction of the threaded shaft of the slider body to be laterally long such that the horizontal size (i.e., in the width direction) of the cross-sectional shape can be made larger than the vertical size thereof. By configuring the above cross-sectional shape to be laterally long, the rigidity of the linear guide mechanism is higher than the case of being vertically long.

That is, according to the single-axis actuator of the present embodiment, when the through hole 24 is arranged within the range B, the vertical size of the slider body 2A is formed smaller than the case where the through hole 24 is arranged out of the range B. Therefore, the rigidity of the linear guide mechanism is improved.

Figure 6A:
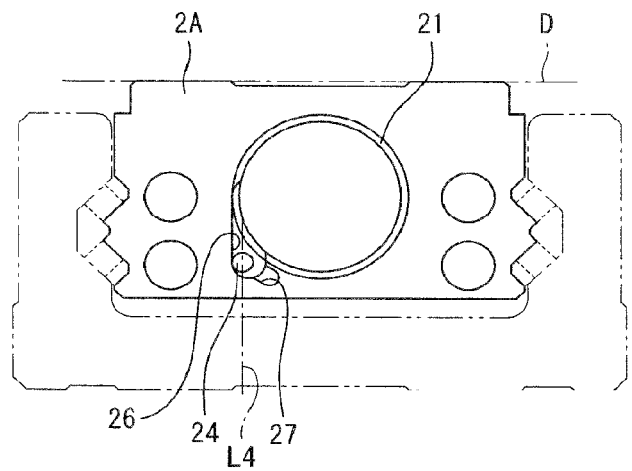
FIG. 6A is a cross-sectional view illustrative of an example, according to a modification of the first embodiment, in which a direction of the end deflector scooping the balls is perpendicular to the top face of the slider body.
Figure 6B:
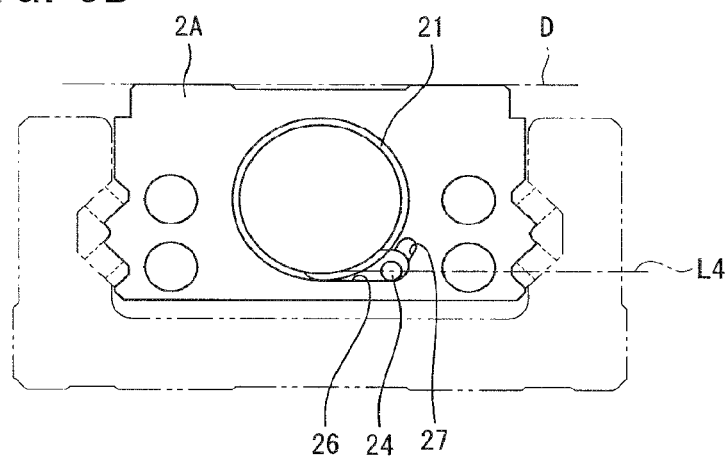
FIG. 6B is a cross-sectional view illustrative of an example, according to a modification of the first embodiment, in which a direction of the end deflector scooping the balls is parallel to the top face of the slider body.

It is to be noted that in the single-axis actuator according to the present embodiment, the direction in which the end deflector 6 scoops the balls, as indicated by a line L4 in FIG. 5, is not parallel or perpendicular to the top face D of the slider body 2A. In contrast, in the example illustrated in FIG. 6A, the direction in which the end deflector 6 scoops the balls (i.e., the line L4) is perpendicular to the top face D of the slider body 2A. In addition, in the example illustrated in FIG. 6B, the direction in which the end deflector 6 scoops the balls (i.e., the line L4) is parallel to the top face D of the slider body 2A.

Figure 6C:
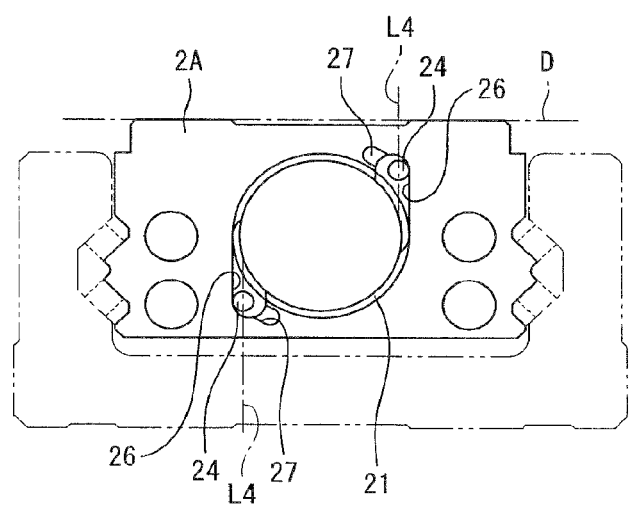
FIG. 6C is a cross-sectional view illustrative of an example including a double threaded screw, according to a modification of the first embodiment.

In the case where the direction in which the end deflector 6 scoops the balls is either parallel or perpendicular to the top face D of the slider body 2A, in forming on the slider body 2A the depressions 26 and 27 into which the end deflector 6 is fit by machine processing, the processing standard is easily satisfied and the processing workability is improved. The same applies to not only single threaded screws but also double or quadruple threaded screws. The example of FIG. 6C illustrates the double threaded screw and the direction in which the end deflector 6 scoops the balls is perpendicular to the top face D of the slider body 2A.

Second Embodiment

Figure 7:
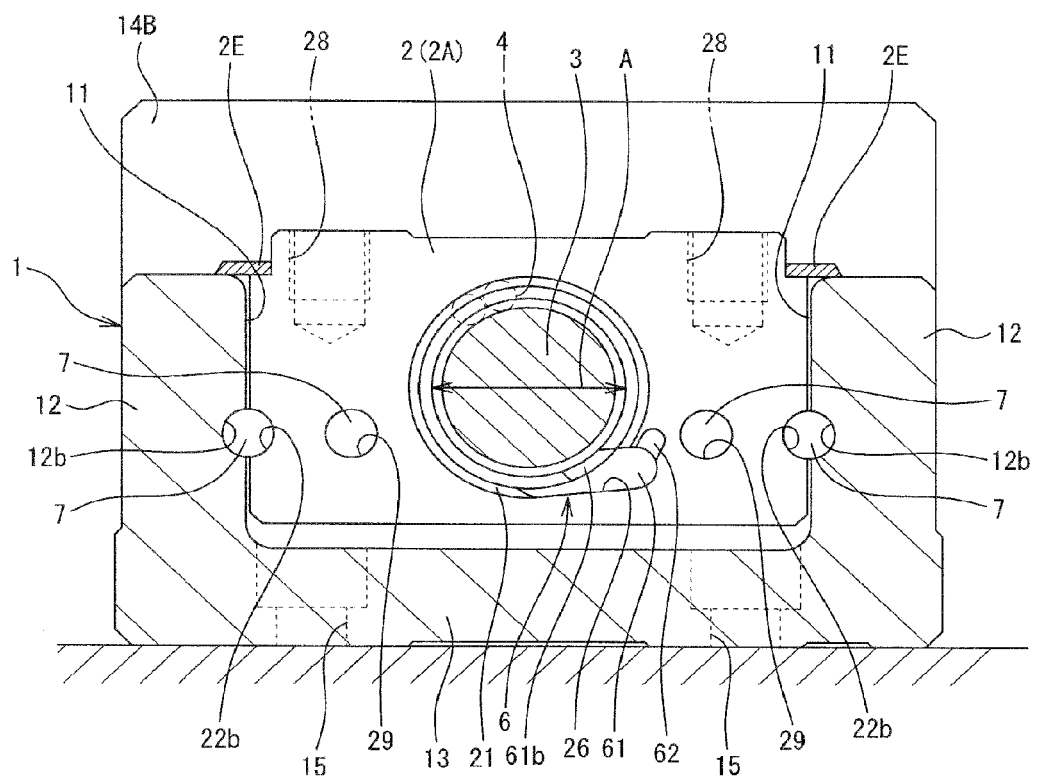
FIG. 7 is a view illustrative of a single-axis actuator according to a second embodiment of the present invention, and is a view corresponding to the cross-sectional view take along line A-A of FIG. 1.

The single-axis actuator according to a second embodiment, as illustrated in FIG. 7, has the same configuration as that of the single-axis actuator according to the first embodiment except that the rolling elements of the linear guide mechanism are different.

In the second embodiment, balls 7 are provided for the rolling elements, so that the inner faces of the side parts 12 have rolling grooves (rolling faces) 12b for the balls 7 and the slider body 2A has rolling grooves 22b (rolling faces), respectively. In addition, the slider body 2A has through holes 29 extending in the longitudinal direction of the threaded shaft, as the returning passage for the balls 7.

With the above configuration, the linear guide mechanism of the single-axis actuator encompasses the rolling grooves 12b of the guide rail 1, the rolling grooves 22b of the slider body 2A, the balls 7, the returning passages 29 of the slider body 2A, and the direction changing passages of the end caps 2B. The other configurations are same as those of the single-axis actuator of FIG. 1.

In the single-axis actuator of FIG. 7, the area $S_1$ in the outer circumferential circle of the threaded shaft 3 (i.e., a circle having the diameter indicated by A in FIG. 7) is 23% of the area $S_2$ of the cross section perpendicular to the longitudinal direction of the threaded shaft of the slider body 2A (where $S_1 >= 0.2 S_2$). Specifically, the diameter A is 25 mm, the area $S_1$ is 490.6 mm$^2$, and the area $S_2$ is 2117 mm$^2$. The area $S_2$ conforms to the area of the range surrounded by the circle forming the inner circumferential face of the nut 21 and the external line of the slider body 2A, and does not include the cross-sectional area of the slide plate 2E.

Third Embodiment

The single-axis actuator according to a third embodiment has the same configuration as that of the single-axis actuator according to the first embodiment except that the slider structure is different.

Figure 8:
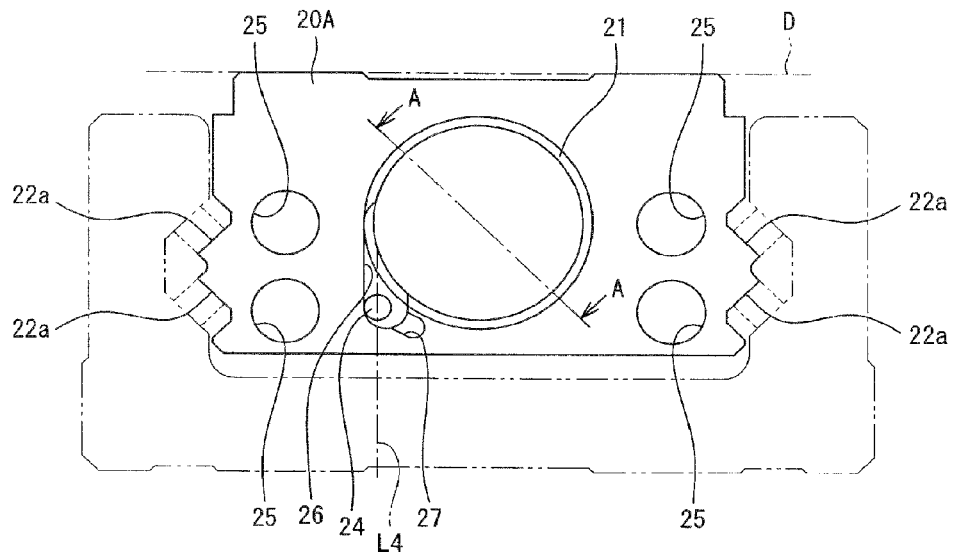
FIG. 8 is a view illustrative of one end face in the longitudinal direction of the threaded shaft of the slider body implementing a single-axis actuator according to a third embodiment of the present invention.
Figure 9:
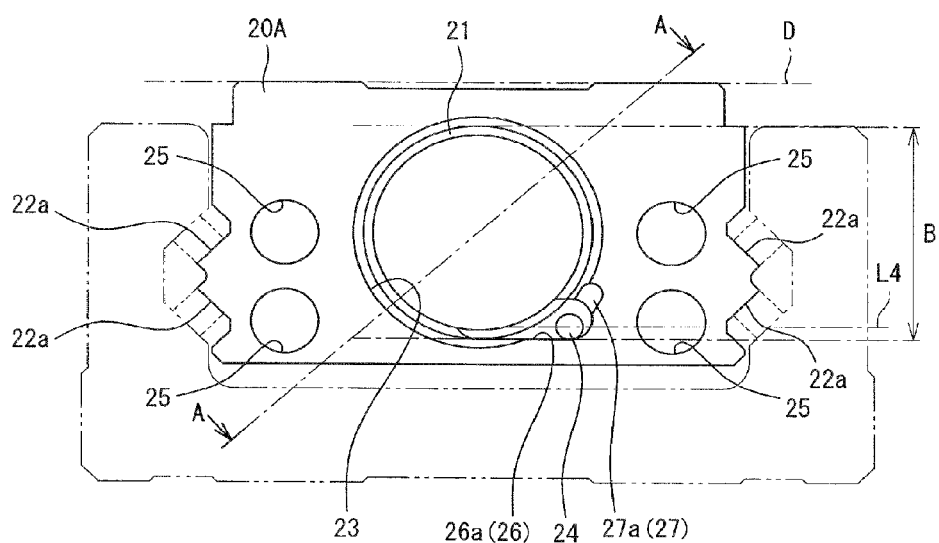
FIG. 9 is a view illustrative of the other end face in the longitudinal direction of the threaded shaft of the slider body implementing the single-axis actuator according to the third embodiment of the present invention.
Figure 10:
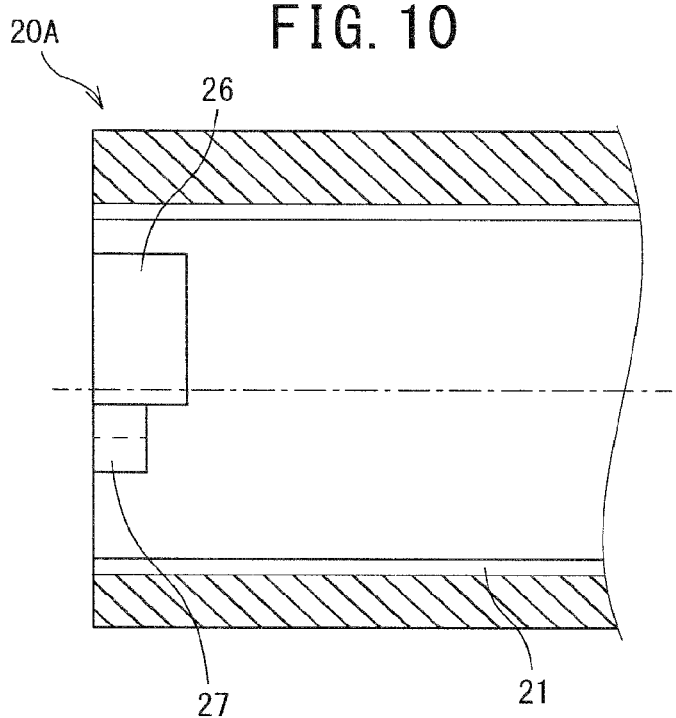
FIG. 10 is a view illustrative of one end in the longitudinal direction of the threaded shaft of the slider body implementing the single-axis actuator according to the third embodiment of the present invention, and is a view corresponding to the cross-sectional view take along line A-A of FIG. 8.
Figure 11:
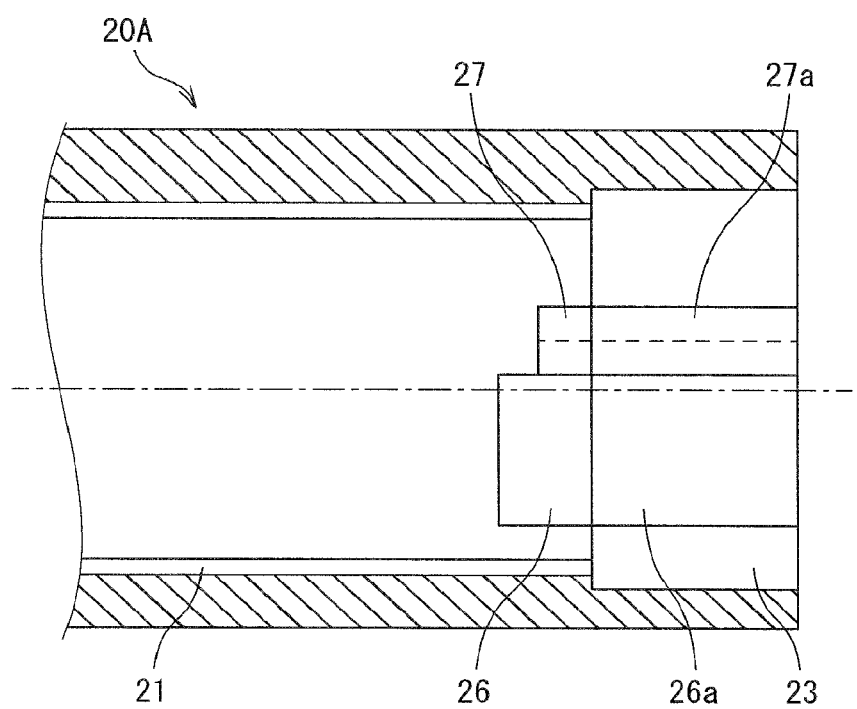
FIG. 11 is a view illustrative of the other end in the longitudinal direction of the threaded shaft of the slider body implementing the single-axis actuator according to the third embodiment of the present invention, and is a view corresponding to the cross-sectional view take along line A-A of FIG. 9.

FIG. 8 is a front view illustrative of the slider body implementing the single-axis actuator according to the third embodiment, and FIG. 9 is a back view illustrative of the slider body. That is, FIG. 8 is a view illustrative of one end face in the longitudinal direction of the threaded shaft of the slider body, and FIG. 9 is a view illustrative of the other end face in the longitudinal direction of the threaded shaft of the slide body. FIG. 10 is a view illustrative of a cross section of one end in the longitudinal direction of the threaded shaft of the slider body, and corresponds to the cross-sectional view taken along line A-A in FIG. 8. FIG. 11 is a view illustrative of a cross section of the other end in the longitudinal direction of the threaded shaft of the slider body, and corresponds to the cross-sectional view taken along line A-A in FIG. 9.

As illustrated in FIG. 8, at one end in the longitudinal direction of the threaded shaft of a slider body 20A, the direction in which the end deflector scoops the balls, as indicated by the line L4, is perpendicular to the top face D of the slider body 20A. As illustrated in FIG. 9, at the other end in the longitudinal direction of the threaded shaft of the slider body 20A, the direction in which the end deflector scoops the balls, as indicated by the line L4, is parallel to the top face D of the slider body 20A.

As illustrated in FIG. 8 to FIG. 12, the other end in the longitudinal direction of the threaded shaft of the slider body 20A is a non-nut part 23 in which the female screw (spiral groove) 21 is not formed, whereas the remaining part corresponds to a nut part in which the female screw 21 is formed. That is, according to the third embodiment, the non-nut part 23 does not exist at one end in the longitudinal direction of the threaded shaft of the slider body 20A. The inner diameter of the non-nut part 23 is larger than the circle forming the groove bottom of the spiral groove formed on the nut part 21.

Figure 12A:
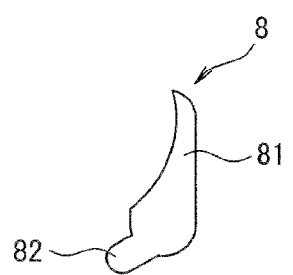
FIG. 12A is a rear view illustrative of a spacer implementing the single-axis actuator according to the third embodiment of the present invention viewed from the left side in FIG. 12B.
Figure 12B:
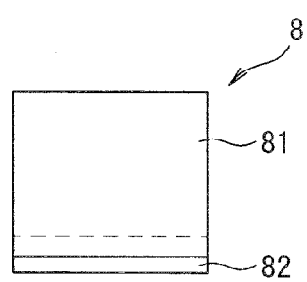
FIG. 12B is a view illustrative of the spacer implementing the single-axis actuator according to a third embodiment of the present invention, and corresponds to FIG. 4B.
Figure 12C:
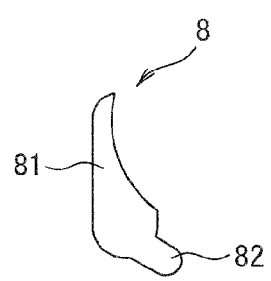
FIG. 12C is a front view illustrative of the spacer implementing the single-axis actuator according to a third embodiment of the present invention viewed from the right side in FIG. 12B.

The single-axis actuator according to the third embodiment has the end deflectors 6 same with that of the first embodiment, and spacers 8 as illustrated in FIG. 12A to FIG. 12C. The spacer 8 includes: a body 81 conforming to the body 61 of the end deflector 6; and a projection 82 conforming to the fixed piece 62 of the end deflector 6. The front shape of the spacer 8 is same with that of the end deflector 6 except that the tongue 61b is not provided. The size in the longitudinal direction of the threaded shaft is slightly larger than the size in the longitudinal direction of the threaded shaft of the non-nut part 23.

As illustrated in FIG. 8 and FIG. 10, one end face in the longitudinal direction of the threaded shaft of the slider body 20A has a notch part (i.e., a circulating part depression) 26, into which the body 61 of the end deflector 6 is fit. The depression 27, into which the fixed piece 62 of the end deflector 6 is fit, is provided adjacent to the notch part 26 in a circumferential direction of the nut part 21.

As illustrated in FIG. 9 and FIG. 11, the other end in the longitudinal direction of the threaded shaft of the slider body 20A has a notch part (i.e., a circulating part depression) 26, into which the body 61 of the end deflector 6 is fit, at a boundary with the non-nut part 23 on inner circumferential face of the nut part 21. In addition, the depression 27, into which the fixed piece 62 of the end deflector 6 is fit, is provided circumferentially adjacent to the notch part 26 of the nut part 21. The inner circumferential face of the non-nut part 23 has spacer depressions 26a and 27a continuous with the notch part 26 and the depression 27, respectively, in the longitudinal direction of the threaded shaft.

The slider body 20A is different in the above-described configurations from the slider body 2A implementing the single-axis actuator according to the first embodiment, but is same as the slider body 2A in the other configurations.

When assembling the slider 2 same as that of the single-axis actuator illustrated in FIG. 1 in the single-axis actuator according to the third embodiment, the body 61 of the end deflector 6 is fit into the notch part 26 at one end in the longitudinal direction of the threaded shaft of the slider body 20A in the same manner as the first embodiment, and in addition, the fixed piece 62 is fit into the depression 27 so as to secure the end deflector 6 onto the end in the longitudinal direction of the threaded shaft of the nut 21 of the slider body 2A.

With the above configuration, the direction changing passage 61a of the body 61 of the end deflector 6 is connected to the through hole 24 of the slider body 20A. Further, by fitting the fixed piece 62 into the depression 27, the end deflector 6 is restricted in the longitudinal direction of the threaded shaft of the slider body 20A and in the radial and circumferential directions of the nut 21, and the rotation of the body 61 is stopped in the above directions.

Then, the end cap 2B, the lubricant supplying member 2C, and the side seal 2D are arranged at one end in the longitudinal direction of the threaded shaft of the slider body 20A, so as to be integrally secured by bolts onto one end face in the longitudinal direction of the threaded shaft of the slider body 20A. Therefore, the female thread is formed on one end face in the longitudinal direction of the threaded shaft of the slider body 20A, but is omitted in FIG. 8.

Figure 13A:
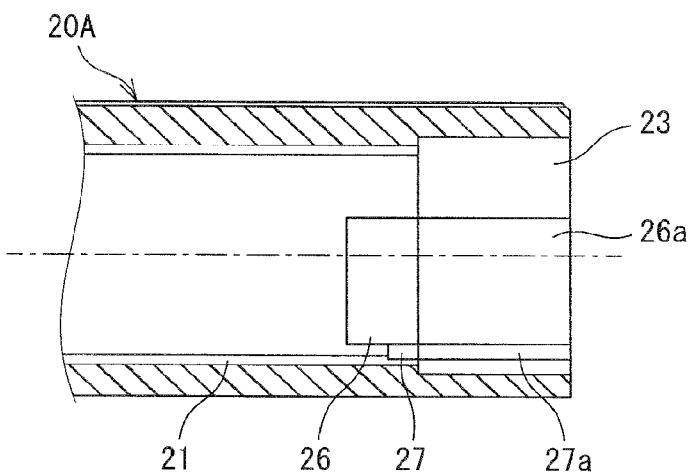
FIGS. 13A, 13B, and 13C are views illustrative of an assembling method of the slider implementing the single-axis actuator according to the third embodiment of the present invention.
Figure 13B:
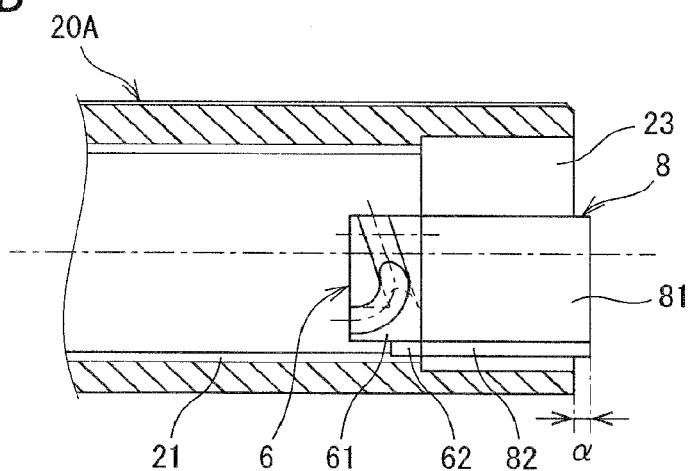
Figure 13C:
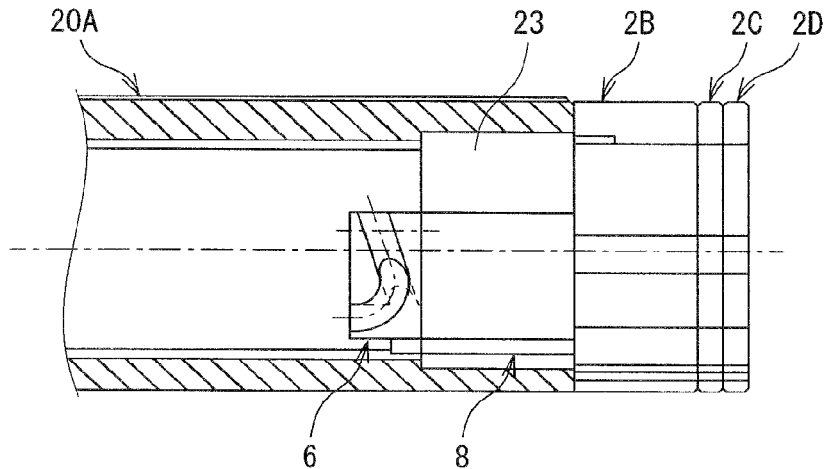

The end deflector and the spacer are assembled into the other end in the longitudinal direction of the threaded shaft of the slider body 20A in a method illustrated in FIG. 13A to FIG. 13C. FIG. 13A is a cross-sectional view illustrative of the other end in the longitudinal direction of the threaded shaft of the slider body, before the end deflector and the spacer are arranged. FIG. 13B is a cross-sectional view illustrative of the other end in the longitudinal direction of the threaded shaft, after the end deflector and the spacer are arranged. FIG. 13C is a view illustrative of a state where the end cap and the like are secured on the outer side of the other end in the longitudinal direction of the threaded shaft of the slider body.

Firstly, the body 61 is inserted into the spacer depression 26a of the non-nut part 23 from the other end face in the longitudinal direction of the threaded shaft of the slider body 20A, and the end deflector 6 is moved to the nut part 21 in the longitudinal direction of the threaded shaft of the slider body 20A with the fixed piece 62 being inserted into the spacer depression 27a. In this manner, the body 61 and the fixed piece 62 of the end deflector 6 are fit into the notch part 26 and the depression 27 of the nut part 21, respectively.

Next, the body 81 is inserted into the spacer depression 26a of the non-nut part 23 from the other end face in the longitudinal direction of the threaded shaft of the slider body 20A, the spacer 8 is moved in the longitudinal direction of the threaded shaft of the slider body 20A with the projection 82 being inserted into the spacer depression 27a, and the body 81 and the projection 82 of the spacer 8 are fit into the spacer depressions 26a and 27a of the non-nut part 31, respectively. FIG. 13B illustrates the above state.

In this state, the spacer 8 protrudes from the other end face in the longitudinal direction of the threaded shaft of the slider body 20A by a dimension $\alpha$. In addition, the direction changing passage 61a of the body 61 of the end deflector 6 is connected to the through hole 24 of the slider body 20A. Further, by fitting the fixed piece 62 into the depression 27, the end deflector 6 is restricted in the longitudinal direction of the threaded shaft of the slider body 20A and in the radial and circumferential directions of the nut part 21, and the rotation of the body 61 is stopped in the above directions.

Next, the end cap 2B, the lubricant supplying member 2C, and the side seal 2D are arranged on the other end in the longitudinal direction of the threaded shaft of the slider body 20A, so as to be integrally secured by bolts onto the other end face in the longitudinal direction of the threaded shaft of the slider body 20A. Therefore, the female thread is formed on the other end face in the longitudinal direction of the threaded shaft of the slider body 20A, but is omitted in FIG. 9 and FIG. 13A to FIG. 13C. FIG. 13C illustrated the above state.

In this state, the spacer 8 is arranged in a shrinking state by elastic deformation between the end deflector 6 and the end cap 2B. That is, the spacer 8 is elastically deformable more easily than the end deflector 6 and the end cap 2B, and is made of a material elastically deformable by the dimension $\alpha$ or more. According to the single-axis actuator of the third embodiment, the state of securing the end deflectors 6 in the slider body 20A at proper positions is maintained by the spacers 8 and the end cap 2B. Furthermore, the direction changing passage of the linear guide mechanism can be held at a proper position by the end cap 2B.

As described heretofore, according to the single-axis actuator of the third embodiment, the spacer 8 is used as a member for preventing the end deflector 6 from being dropped out to the non-nut part 23 in the longitudinal direction of the threaded shaft. Moreover, the spacer 8 having the shape conforming to the end deflector 6 is used, and the spacer depressions 26a and 27a continuous with the depressions 26 and 27 into which the end deflector 6 is fit, respectively, are provided.

For this reason, according to the single-axis actuator of the third embodiment, the work of attaching the end deflector 6 is facilitated and the confirmation work of the attachment state is eliminated. Additionally, since the diameter in the whole longitudinal direction of the threaded shaft of the non-nut part 23 need not be enlarged, the mechanical strength of the slider body 20A is ensured.

It is to be noted that the spacers may take any other shape than the shape conforming to the circulating part, as far as the size of the spacer in the longitudinal direction of the threaded shaft conforms to the non-nut part. When the size of the non-nut part in the longitudinal direction of the threaded shaft is long, however, the work of assembling the end deflectors is facilitated in arranging the spacer depression continuous with the circulating part depression by use of the spacer having a shape conforming to the circulating part. Therefore, the confirmation work of confirming the attached state can be eliminated and is preferable.

In addition, the spacer may have a coil spring elastically deformable in the longitudinal direction of the threaded shaft. Furthermore, the spacer may be made of a solid lubricant or lubricant supplier, so that the lubricant may be supplied to the raceway of the ball screw mechanism from the spacer.

Moreover, according to the above embodiment, as described above, an example has been given such that one spacer 8 is used and the size in the longitudinal direction of the threaded shaft of the spacer 8 is configured to be the size of the non-nut part 23 of the slider body 20A in the longitudinal direction of the threaded shaft+$\alpha$ (i.e., elastically deformed size of the spacer 8). As the spacer for the slider body having an integral multiple of a reference value of size of the non-nut part in the longitudinal direction of the threaded shaft, however, multiple spacers for the slider body having the reference value that is the size of the non-nut part in the longitudinal direction of the threaded shaft can be used. With this configuration, it is possible to reduce the cost more than the case where different spacers are provided for every size of the non-nut part in the longitudinal direction of the threaded shaft.

Additionally, according to the present embodiment, the non-nut part 23 is provided only at the other end in the longitudinal direction of the threaded shaft of the slider body 20A. However, the present invention is applicable to the case where the non-nut parts are provided at both ends in the longitudinal direction of the threaded shaft.

Furthermore, according to each of the above embodiments, the single-axis actuator having one slider has been described. However, the present invention is applicable to the single-axis actuator having two or more sliders.

Moreover, each of the above embodiments and each of the above examples may be combined as needed.

REFERENCE SIGNS LIST 1 guide rail
11 depression of guide rail
12 side part of guide rail
12a rolling face of guide rail
12b rolling groove of guide rail (rolling face)
13 bottom part
14A, 14B end member of guide rail
15 through hole
2 slider
20 slider
2A slider body
20A slider body 2B end cap
2C lubricant supplying member
2D side seal
2E slide plate
21 nut, nut part
22a rolling face of slider
22b rolling groove of slider (rolling face)
23 non-nut part
24 through hole (ball returning passage)
25 through hole
26 notch part (circulating part depression)
26a depression (spacer depression)
27 depression (circulating part depression)
27a depression (spacer depression)
29 through hole (ball returning passage)
3 threaded shaft
4 ball
5 roller (rolling element)
51 returning passage for roller
51a sleeve
6 end deflector
61 body
61a direction changing passage
62 fixed piece
7 ball
8 spacer
81 body
82 projection

The invention claimed is:

1. A single-axis actuator comprising:
a guide rail having a letter U shaped cross section perpendicular to a longitudinal direction of the single-axis actuator;
a slider arranged in a depression of the guide rail having the letter U shaped cross section;
a plurality of rolling elements allocated between the guide rail and the slider;
a nut formed in the slider to be parallel to the guide rail;
a threaded shaft penetrating through the nut; and
a plurality of balls allocated in a raceway between a spiral groove of the nut and a spiral groove of the threaded shaft, wherein
the guide rail has a rolling face implementing a rolling passage for the plurality of rolling elements, on each of inner side faces opposing each of side faces of the slider,
a rolling face for opposing the rolling face of the guide rail and implementing the rolling passage, a returning passage for the plurality of rolling elements, and a direction changing passage for communicating the returning passage and the rolling passage,
the plurality of rolling elements are allocated in a circulating passage implemented by the rolling passage, the returning passage, and the direction changing passage,
a ball returning passage for returning the plurality of balls from an end point of the raceway to a start point of the raceway is implemented by a through hole penetrating through the slider in a longitudinal direction of the threaded shaft, and circulating parts having direction changing passages connected with the through hole and allocated at both ends in the longitudinal direction of the threaded shaft of the slider,
a rotational force of the threaded shaft is transmitted via the plurality of balls to the nut by rotation of the threaded shaft, the rolling elements circulate in the circulating passage while rolling in a loaded state, and the slider is movable along the guide rail;
the slider includes a slider body and an end cap secured on an outer side of the slider body in the longitudinal direction of the threaded shaft,
the spiral groove of the nut is formed in the slider body,
an end of the slider body in the longitudinal direction of the threaded shaft has a non-nut part in which the spiral groove is not formed,
a circulating part depression is formed for fitting the circulating part at a boundary with the non-nut part on an inner circumferential face of a nut part in which the spiral groove is formed,
the circulating part is fit in the circulating part depression,
a spacer is arranged in the non-nut part,
the spacer is arranged between the circulating part and the end cap in a contact state, and
a spacer depression into which the spacer is fit is formed to be continuous with the circulating part depression in the longitudinal direction of the threaded shaft, and the spacer is fit in the spacer depression.

2. The single-axis actuator according to claim 1, wherein the slider is one of a plurality of sliders.

* * * * *